(12) United States Patent
Conner et al.

(10) Patent No.: US 6,958,883 B2
(45) Date of Patent: Oct. 25, 2005

(54) APPARATUS FOR READING AND WRITING CARDS HAVING ROTATING MEMORY

(75) Inventors: Finis Conner, Carmel, CA (US); Anil Nigam, Saratoga, CA (US)

(73) Assignee: StorCard, Inc., Carmel, CA (US)

( * ) Notice: Subject to any disclaimer, the term of this patent is extended or adjusted under 35 U.S.C. 154(b) by 279 days.

(21) Appl. No.: 10/193,824

(22) Filed: Jul. 11, 2002

(65) Prior Publication Data
US 2003/0043485 A1 Mar. 6, 2003

Related U.S. Application Data
(60) Provisional application No. 60/308,164, filed on Jul. 27, 2001.

(51) Int. Cl.[7] .............................................. G11B 5/012
(52) U.S. Cl. .................................................. 360/97.01
(58) Field of Search ........................... 360/97.01, 98.07, 360/98.08, 99.02, 99.08

(56) References Cited

U.S. PATENT DOCUMENTS

| | | | |
|---|---|---|---|
| 5,107,099 A | * | 4/1992 | Smith ......................... 235/449 |
| 5,375,037 A | | 12/1994 | Le Roux |
| 5,486,687 A | | 1/1996 | Le Roux |
| 5,679,007 A | | 10/1997 | Potdevin et al. |
| 6,147,837 A | | 11/2000 | Schick et al. |
| 6,179,209 B1 | * | 1/2001 | Goodwin et al. ........... 235/486 |
| 6,307,709 B1 | * | 10/2001 | Liu et al. .................... 360/131 |
| 6,513,720 B1 | * | 2/2003 | Armstrong .................. 235/492 |
| RE38,290 E | * | 10/2003 | Rose .......................... 360/131 |
| 2001/0004339 A1 | * | 6/2001 | Ishida et al. .................. 369/37 |

FOREIGN PATENT DOCUMENTS

| | | |
|---|---|---|
| EP | 0788103 A2 | 8/1997 |
| EP | 0788103 A3 | 8/1997 |
| EP | 0984449 A1 | 3/2000 |
| WO | WO99/41673 A1 | 8/1999 |
| WO | WO99/53496 A1 | 10/1999 |

* cited by examiner

*Primary Examiner*—David Hudspeth
*Assistant Examiner*—Mitchell Slavitt
(74) *Attorney, Agent, or Firm*—Townsend and Townsend and Crew LLP

(57) ABSTRACT

Apparatus is described for reading data from or writing data onto a credit card-sized storage media containing a rotating magnetic memory. The reader includes a spindle motor and an arm with a magnetic head position thereon, as well as integrated circuits for controlling its operation. The reader preferably complies with standards for PCMCIA cards, enabling the reader to be inserted into the host system such as a personal computer or a laptop for use.

40 Claims, 17 Drawing Sheets

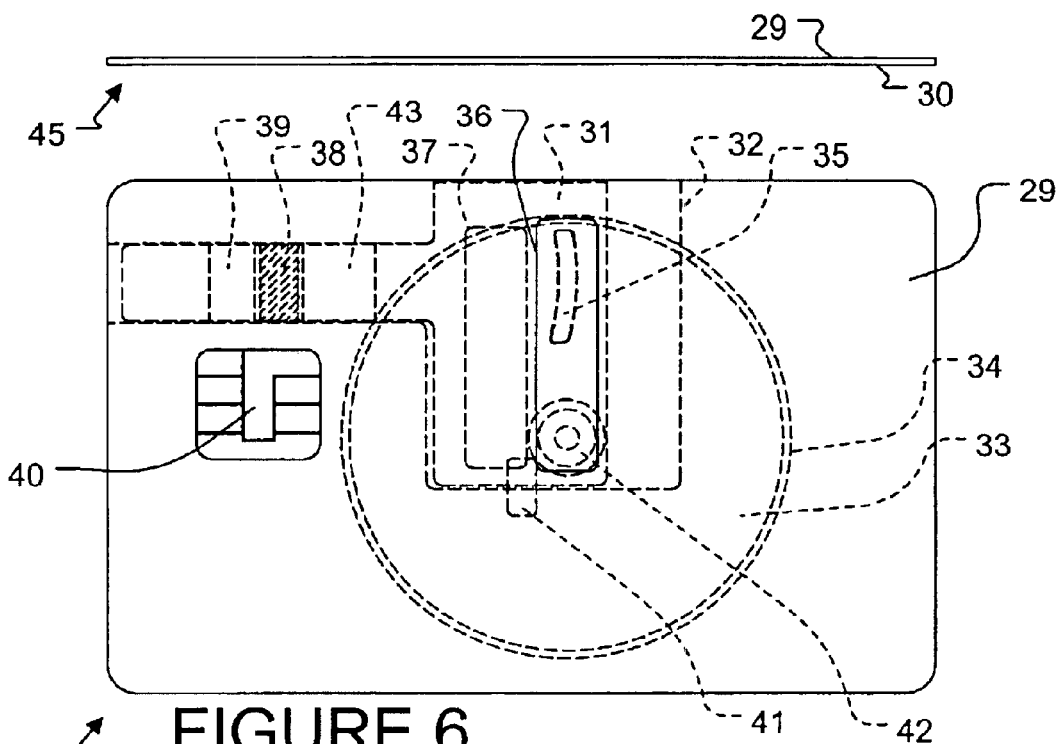
FIGURE 5
FIGURE 6
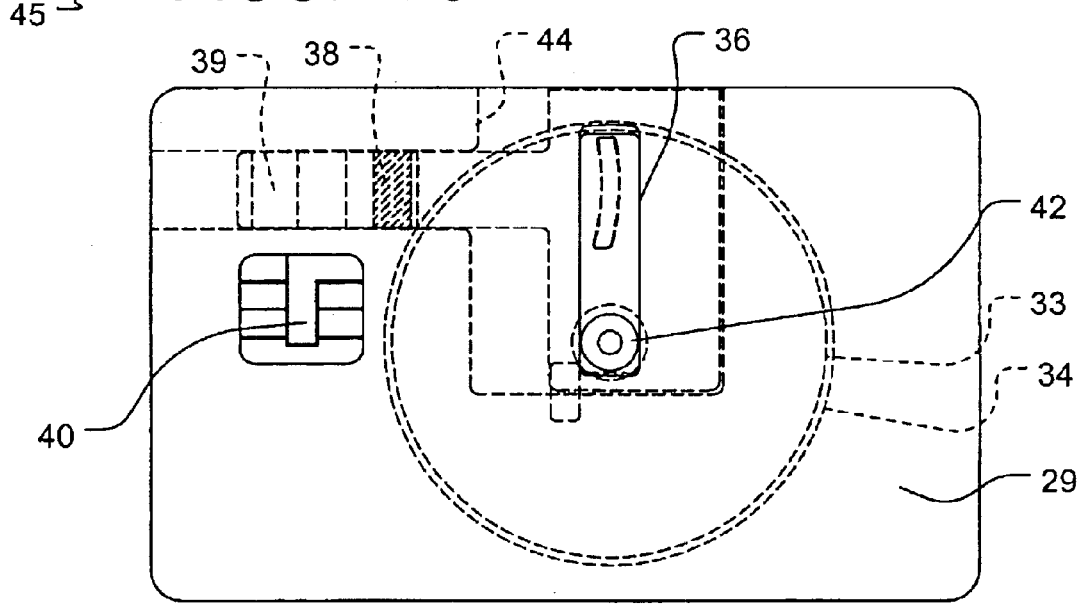
FIGURE 7

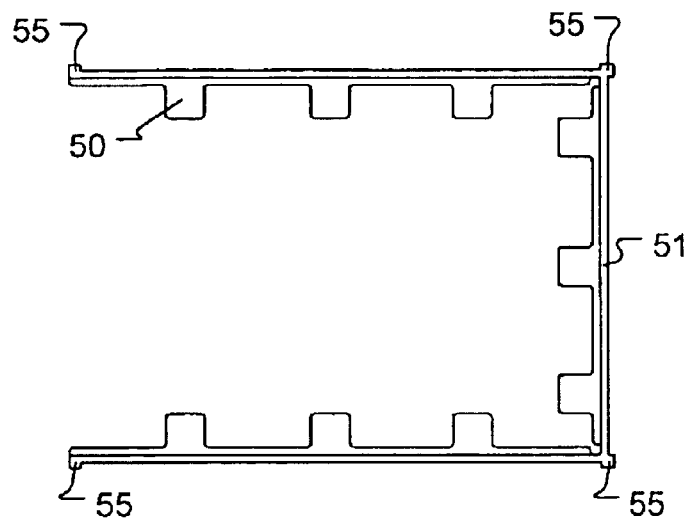
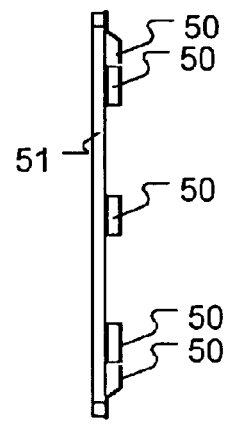
FIGURE 12    FIGURE 13
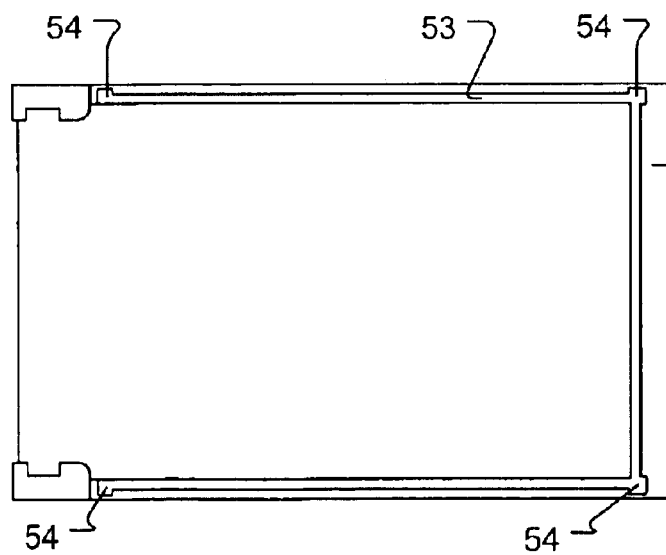
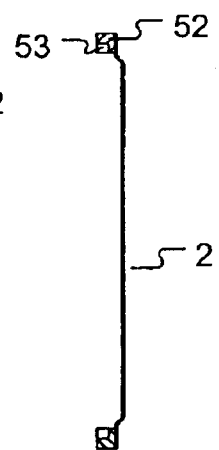
FIGURE 14    FIGURE 15

APPARATUS FOR READING AND WRITING CARDS HAVING ROTATING MEMORY

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

This invention relates generally to the storage of information and to credit cards, as well as to software applications serviced by these cards. The credit card is ubiquitous and almost every wallet contains two, and often more cards. This invention provides a method by which a large storage volume can be offered on such a card, providing greater versatility and functionality to a common and useful device, for example, sufficient memory to store an entire feature film on each card.

Prior art teaches the fabrication of a card with a PVC plastic substrate and artwork laminated to and/or printed on to the front face, and minimal (a magnetic strip) or no storage. Lettering is embossed on the card, and space provided on the back for a specimen signature. All transactions have the backing of a reputable financial institution. A remote infra-structure requires the merchants to call for authorization of charges. The financial institution gives the card holder credit to cover these transactions, and maintains an organization for billing, transaction verification and fraud control. In the United States long distance telephone calls are economical, so a card with a magnetic strip on the back, containing about 140 bytes of information has become popular. The user or the merchant swipes the card on a reader, enters a PIN code and a dollar amount of the transaction. The resulting information is then transmitted via modem or a network to a remote site for authorization. The limited storage available on these cards, however, is not sufficient to reduce or eliminate the complex, remote infra-structure or the cost to process each transaction. In Europe and other countries where telephone services are expensive, a unique card known as a Smart Card has become popular.

The Smart Card comes in a variety of configurations, some with integrated circuit memory of about 1 to 8 Kbytes and others with an additional integrated circuit on the card to manipulate the on-board memory. The maximum storage offered in these cards is 32 Kbytes, which was the same amount of on-board memory available on a PC when it first shipped in the early 1980s. The PC, however, required an external floppy drive with 150K bytes of replaceable volume to become a useful appliance. Smart Cards, possibly for the lack of sufficient memory, have not been widely accepted by the consumer in the United States.

Optical memory cards such as those taught by U.S. Pat. Nos. 6,199,761; 5,932,865; 6,120,907 and others, consist of an optical recording media bonded to the surface of the card. Such optical cards require a unique reader, now costing more than $2,000. Each optical card had a maximum storage capacity of 4.9M Bytes. In view of their greater memory, these cards have found niche applications, but the high cost of implementation has limited their popularity.

Other prior approaches, such as U.S. Pat. Nos. 6,131,816 and 5,107,099, teach a unique magnetic strip made from stainless steel and sputter coated with high coercivity magnetic films and laminated in the card. The design of a special purpose reader is also taught, which removes this strip and installs it on a reciprocating table where a magnetic recording head is utilized to read and write data to and from the strip. That patent states that a large storage capacity could be attained on each card, however, the card reader is unique and expensive, similar in characteristics to the optical card, and requires the development of a significant infra-structure to support such a system.

Prior art also teaches the design of special purpose magnetic and optical storage products that record and read data back from unique mediums, such as floppy disk drives, ZIP disk drives, hard disk cartridge drives, CD-R/W and DVD-RAM products. All these devices require the use of a recording medium that is larger, and thicker than a Credit card, and consequently, do not offer the convenience of being able to be slipped into a wallet for easy transportation. None of these approaches provide a compact reader for reading credit card sized cards that include a rotating magnetic memory, such as a floppy disk.

Cards containing large storage volume can provide services that hereto required the maintenance of a significant infrastructure to control unauthorized access to data, to equipment, and to facilities. For example, an American Express Credit card, VISA or MasterCard adopting the invention herein can serve as a financial card, a personal wallet, a record keeper, a storage of favorite songs (with CD quality), a secure key to access confidential records at financial institutions or on the Internet, an electronic album with both still and video clips of family and friends, a complete set of personal medical records, and a host of other features. By virtue of the card, one does not need to remember a variety of passwords or personal identification pins (PINs) to access bank accounts. The card has all this data, and furthermore, this data can be encrypted with a 512 bit or larger key to provide a high level of security.

Data storage is fundamental and can increase the versatility of the common credit card. Processing power can be located in the reading device or local on the card in a manner similar to the Smart Card. If the credit card will be used in equipment that contain a sophisticated processor, however, burdening the credit card with the added expense of a processor chip may not be necessary. This invention provides an economical reader for use with the credit cards so equipped. The reader complies with the industry standard PCMCIA interface and size. This enables it to be used with personal computers and laptops, which provide a host system. The reader may be implemented at low cost. The invention described herein focuses on the design of the reader for reading the cards. The cards are described in a co-pending U.S. patent application.

BRIEF SUMMARY OF THE INVENTION

This invention provides an apparatus for reading data from, or writing data to, a credit card-sized apparatus which includes a rotating magnetic memory. The card storing the data conforms with the standards for such products, including, in a preferred embodiment, the SmartCard standard in which an integrated circuit is also provided on the card. Within the credit card is positioned magnetic media which, when rotated, can be accessed to retrieve information from the card, or write information onto it.

The reader includes a port for receiving the card. As the card is inserted into the reader, a mechanism in the reader opens a shutter on the card to allow the reader to access the card. Also as it is inserted into the reader, the card is deflected slightly to cause a hub within the card affixed to the magnetic media, to engage a chuck and spindle motor within the reader. Once in position the motor is activated to cause the magnetic media to spin within the reader. Within the reader, an arm with a magnetic head may then be positioned in a desired location to read data from or write data to the card.

In a preferred embodiment the reading and writing apparatus is fabricated to comply with the PCMCIA standards for PC cards, specifically a type II PC card. This enables the reader to be inserted into a port in a conventional personal computer or laptop computer, which can then function as a host system. Pins within the computer engage a socket on one end of the reader to establish electrical connections between the host system and the reader. While a PCMCIA interface is preferred, other embodiments may employ other interfaces, e.g. a USB or a custom interface. The reader preferably includes one or more integrated circuits for controlling the operation of the reader to enable it to read data from and write data to the card.

BRIEF DESCRIPTION OF THE DRAWINGS

FIG. 5 is a side view of a card;

FIG. 6 is a top view of the card with the shutter in the closed position;

FIG. 7 is a top view of the card with the shutter in the open position;

FIG. 12 is a plan view of the seal elements and the flexure support;

FIG. 13 is a side view of the structure shown in FIG. 12;

FIG. 14 is a plan view of the top cover with the housing;

FIG. 15 is a section of the top cover illustrating cavities for the structure of FIG. 12;

DESCRIPTION OF THE PREFERRED EMBODIMENTS

ISO 7816 is an internationally accepted standard for the size of credit cards, their flexibility, arrangement of information, and other features. The preferred embodiments of this invention relate to cards that conform to the ISO 7816 standard for credit cards. It will be appreciated that there are other card configurations that are thicker (or of a different size) than this standard, and the invention also could be applied to those cards utilizing the concepts described herein. The preferred embodiments in this disclosure relate to an ISO 7816 card reader configured in the form of a Type II, PC card. The approximate dimensions for such a PC card are length 3.370 inches, width 2.126 inches, and thickness 0.197 inches. Of course, other sized reader configurations and interfaces, such as USB or a custom interface, can also be provided using the concepts presented herein.

Figure 1:
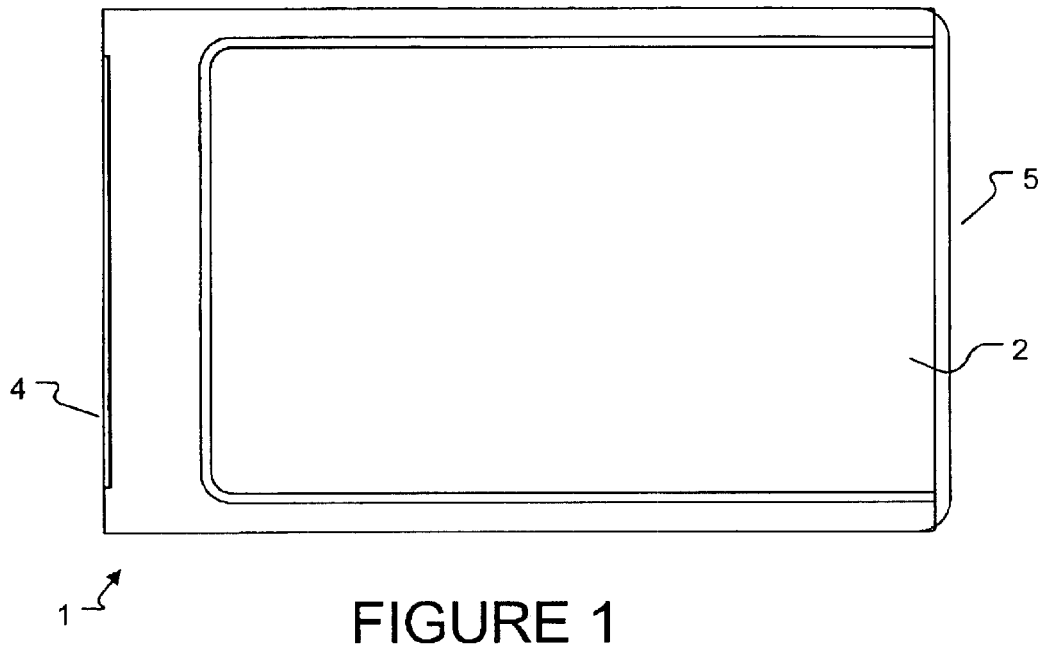
FIG. 1 is a top view of a preferred embodiment of the reader.
Figure 2:
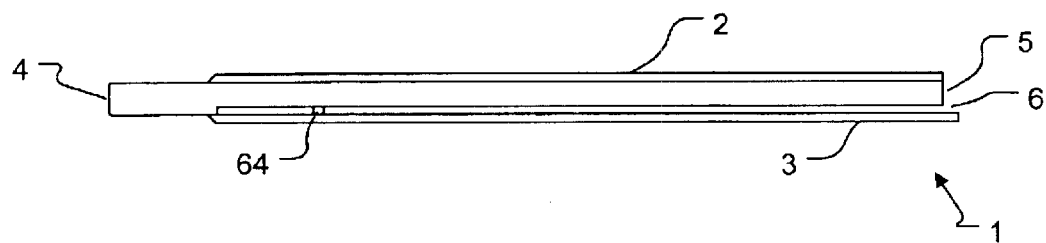
FIG. 2 is a side view of the reader.

FIG. 1 is a top view of the exterior of reader 1, and FIG. 2 is a side view. While the device depicted is usually referred to therein as a "reader," in the preferred embodiment, the device also writes data onto the credit card sized storage. The reader 1 has a casing that conforms to the dimensions stated above, with a top cover assembly 2, a bottom cover assembly 3, a front panel 5 and a rear panel. To comply with the Type II PC Card standard, the rear panel preferably will have a 68 pin connector 4. The space 6 between the top cover assembly 2 and the bottom cover 3 is where a card sized storage device is inserted for reading or writing operations by the reader. In this embodiment the dimensions of reader 1 allow it to be flush mounted within a conventional PC card slot.

Figure 3:
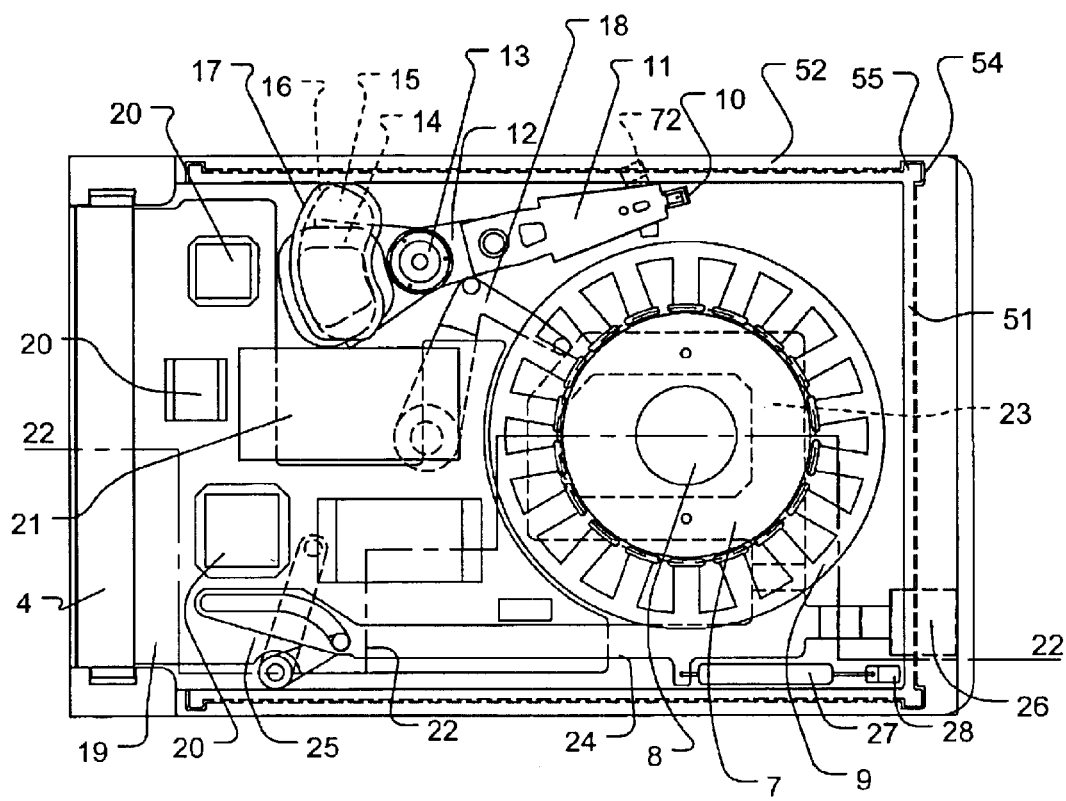
FIG. 3 illustrates the structure of the reader.
Figure 4:
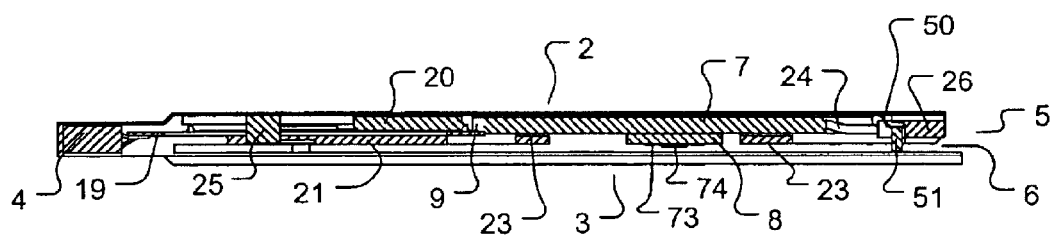
FIG. 4 is a side view of the reader through a section along a line shown in FIG. 3.

FIG. 3 is a plan view of the internal structure of reader 1, and FIG. 4 is a corresponding side view, along line 22 in FIG. 3. The major components of the reader are the spindle motor 7, consisting of a stator 9 and a rotor assembly 8 that includes bearings, chucking plate 73 and disk centering shaft 74. Spindle motor 7 is attached to cover 2 and is about 0.122 inch in height, measured to the chucking plate flange 73. Such spindle motors are commercially available from Nidec Corporation of Japan.

A magnetic head 10, mounted to a gimbal 11, performs the reading and writing of data. The head/gimbal assembly is attached to a rotor 12. The rotor assembly is generally similar to those found in hard disk drive products. To reduce the cost of the system, in the preferred embodiment, only one head is utilized. Of course for reading two sided disks, two head embodiments may also be employed. The rotor 12 has a pivot assembly 13 with ball bearings (not shown). This rotor is attached to cover 2 and is about 0.116 inches high. A coil 14 is configured on the side opposite to the recording head 10. The rotor is free to rotate about an axis passing through the pivot assembly 13. The coil 14 is suspended in a space between two soft magnetic plates 17 and a permanent magnet 15. The rotor is actuated by supplying an electric current to coil 14, which creates a magnetic field that interacts with the field developed between the plates 17. The resulting force causes coil 14 to rotate about the pivot 13. This procedure is utilized for servo tracking and seek control of the recording elements in head 10.

Lever 18 provides the function of a retract linkage when there is no card installed in reader 1, and during operation, as the inner crash stop. This assembly is described in more detail below. The control functions for reader 1 are provided by conventional commercially available integrated circuits 20 that are about 0.059 inch thick and mounted on a multi-layer PCB 19 which is about 0.015 inch thick. This PCB receives power from connector 4, which provides the interface between the reader and a host system. The integrated circuits 20 perform the functions of read/write control, servo and interface controller, spindle motor and voice coil driver. They will also include flash memory to store the control firmware code. A low profile surface mount connector 21, for example, as available from AMP Inc, is mounted on the PCB 19. This connector is positioned to interface with an integrated circuit, for example, as on a Smart Card, or card 45 when the card is fully inserted into the reader. Reader 1 can operate with both commercially available Smart Cards, as well as cards constructed utilizing the techniques described in co-pending commonly assigned U.S. patent application Ser. No. 10/194,132, entitled "A Smart Card with Rotating Storage." This application is incorporated by reference herein.

Figure 18:
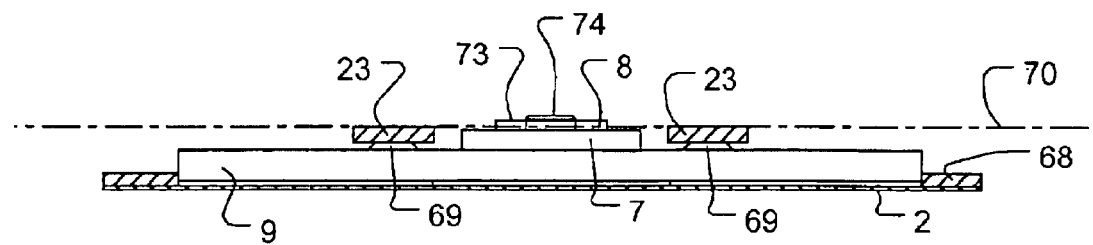
FIG. 18 illustrates a datum with reference to the spindle motor.

The card to be read or written is positioned in reader 1 such that the top surface of the card is located in a plane described by the platform 23 as shown in FIG. 18. This platform is connected to a linkage 24 which contains a mechanism 25 and a button 26. This linkage functions to engage the disk located in the card on the spindle motor 7, and also eject the card, disengaging the disk from the spindle motor flange.

FIG. 5 is a side view of a card from the above cited co-pending patent application. The card 45 has a top cover 29 and a bottom cover 30. The card consists of a laminated structure formed by a number of layers. In one embodiment, as shown in FIGS. 6 and 7, the topmost layer contains artwork which is about 0.001 inch thick. The next layer is about 0.006 inches thick and has a recess area 32. This layer has a cut-out 36, which provides the recording head access to the disk 33 surface, and the hub 42 to interface with the spindle motor 7. Disk 33 is housed in a cavity 34 created in the bottom layer 30 which is about 0.024 inches thick. The cavity 34 is about 0.018 inches deep and the bottom wall is about 0.006 inch thick. A liner about 0.0015 inch thick, not shown, is attached to the bottom of cavity 34 and to the bottom surface of the top cover 29, in the area which is not utilized by the shutter 31. The shutter 31 is a plate that is about 0.0025 inch thick and has a long tab that moves in a cavity created between the recess in layer 29 and the top of the layer 30.

Figure 8:
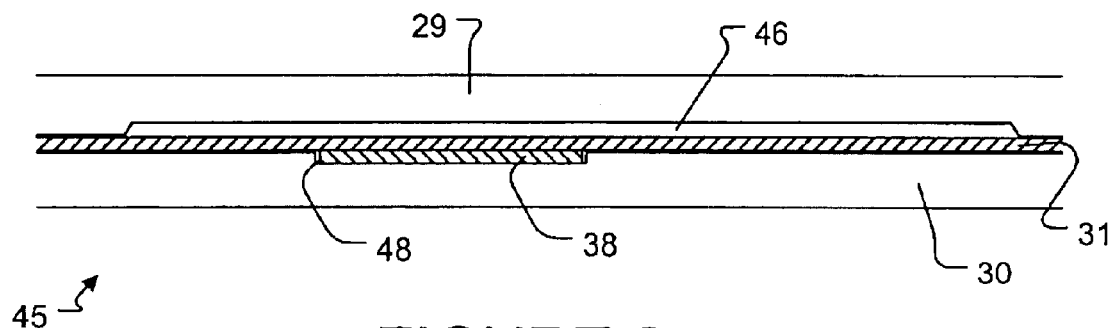
FIG. 8 illustrates the shutter locking mechanism.
Figure 9:
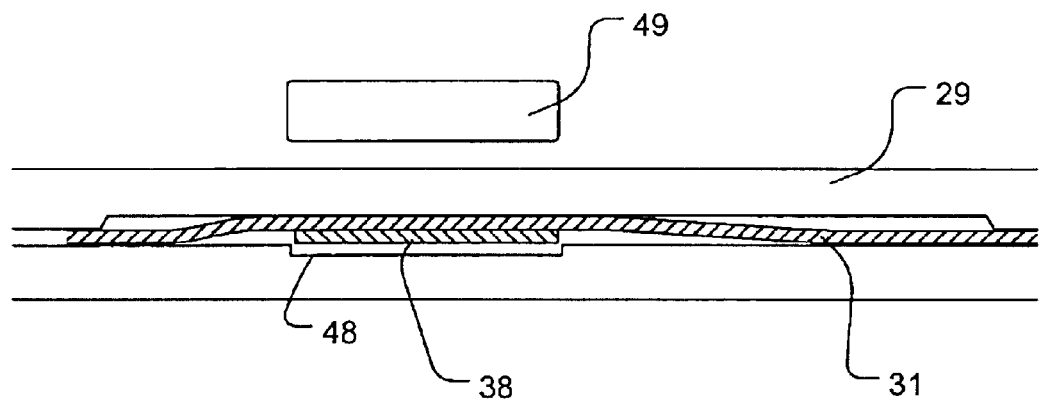
FIG. 9 shows the position of a permanent magnet and the shutter operation.

A soft magnetic material 38 is attached to the shutter tab such that this plate rests in cavity 48 created in layer 30 as shown in FIG. 8. The flexural rigidity of the shutter 31 and the mass of 38 are selected to keep the shutter normally locked in the closed position, in other words, covering opening 36 in top cover 29. When card 45 is inserted into reader 1, a permanent magnet 49 attached to the top cover 2 as shown in FIG. 9, attracts the plate 38 causing it to move out of cavity 48. Further insertion of card 45 in reader 1 causes the shutter 31 to remain stationary while the top and bottom layers 29 and 30 move, thereby aligning the opening in cover 29 with the opening in the shutter 37, as shown in FIG. 7. This is the operating position of card 45.

When card 45 is ejected from reader 2, the top and bottom covers 29 and 30 move relative to the shutter 31, until an edge on shutter 31 meets with surface 44 in the top cover, stopping the relative movement of shutter 31 with reference to the top cover 29 and the bottom cover 30. Finally, plate 38 will move beyond the influence of magnet 49, at which point the flexural rigidity of shutter 31 causes plate 38 to drop into cavity 48, locking the shutter 31 from casual actuation. Shutter 31 overlaps by about 0.06 inch the opening 36 in the top cover. This overlap creates a labyrinth seal which restricts contaminants from entering the cavity 34. A hard material 35 is attached to the bottom cover 30 in card 45. This plate stabilizes the head/disk interface when head 10 is urged towards the surface of a spinning disk 33.

Figure 10:
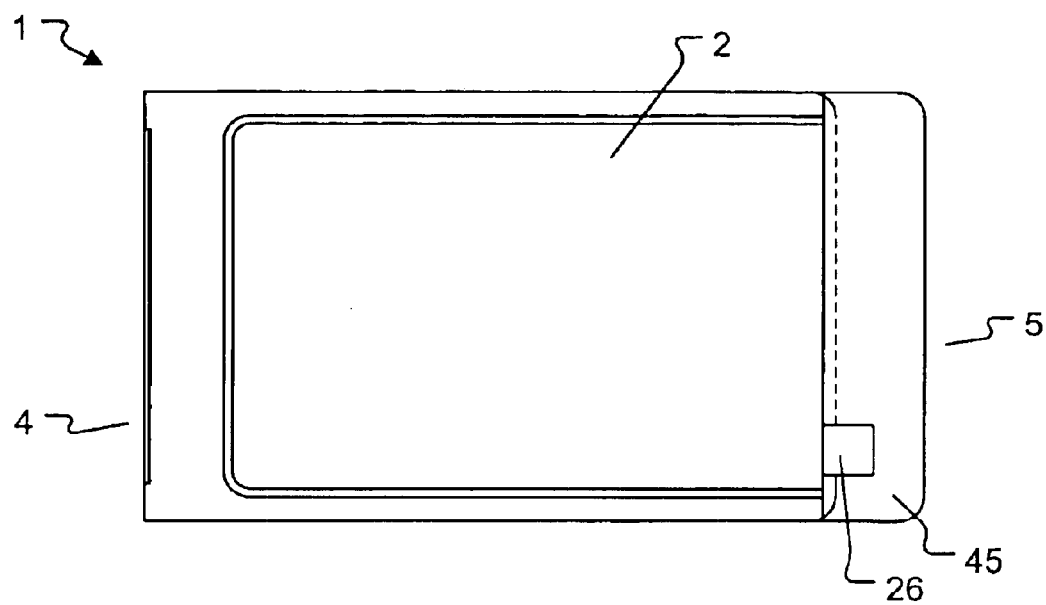
FIG. 10 is a top view of the reader with a card installed for reading.
Figure 11:
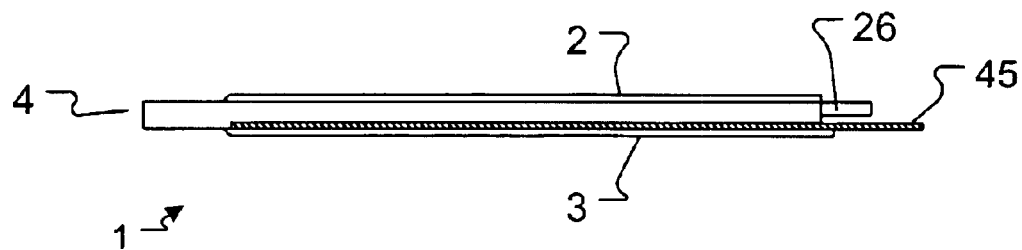
FIG. 11 is another side view of the card.

FIG. 10 shows reader 1 with card 45 fully inserted. In a preferred embodiment a button 26 pops out in the front panel 5 when the spindle motor has engaged hub 42 and the spindle shaft has centered the disk 33. FIG. 11 is a side view of this arrangement. Of course other mechanisms may be employed for extracting the card from the reader.

As can be seen in FIG. 2, because the cavity created between the top layer assembly 2 and the bottom layer 3 is open, contaminants could enter reader 1 compromising the reliability of this system. FIG. 12 illustrates in plan view, and FIG. 13 in side view, an assembly to operate in the cavity developed in top cover 2, to maintain a seal with the bottom cover 3 when no card is installed in reader 1, or with the top surface of card 45 when it is installed.

The assembly consists of an insert molded plastic, or hard rubber member 51. This member is attached to the top cover 2 with a flexure 50. The flexure allows the insert molded element to have motion in the plane perpendicular to the surface of the bottom cover 3. The area in the bottom cover 3 where element 51 is positioned, has a layer of Poron, or other resilient film, that can be compressed with the load applied by suspension 50 so as to establish a seal around the cavity containing the spindle motor 7 and the rotor assembly 12. Further, the resilient film seals the bottom surface of a card 45 when it is installed in reader 1, and creates a vertical force to urge it toward platform 23. The shape and location of this resilient film can be arranged to provide a distributed force on the back of card 45 to cause it to flatten and conform to platform 23.

Element 51 is housed in a plastic housing 52, as shown in FIG. 14 and FIG. 15. Plastic housing 52 is attached to cover 2 and a cavity 53 is formed in it such that it provides rigidity to element 51 in a lateral plane. Contours 55 on element 51 and cavity shapes 54 in housing 52 provide this rigidity, while flexure 50 allows element 51 to move in a direction perpendicular to the top and bottom covers. Furthermore, the clearance between element 51 and the cavity 53 is selected to develop a labyrinth seal in the top cover assembly 2.

To support the forces required to maintain a suitable seal between the Poron attached to the bottom cover 3 and element 51, in one embodiment, the bottom cover is made from a stainless steel sheet about 0.015 inch thick. This is almost twice the thickness of a cover in typical PC Card casings, thus having about eight times greater rigidity. The top cover and the bottom cover are laser welded at the rear of the assembly.

Figure 16:
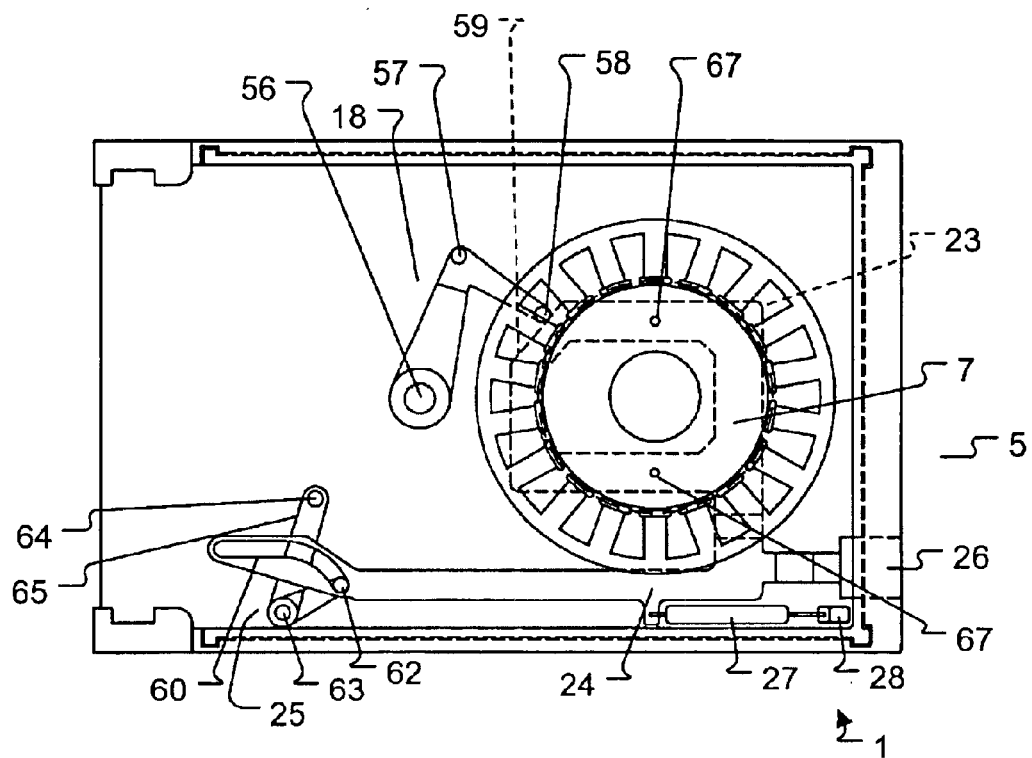
FIG. 16 illustrates the linkage mechanism.
Figure 17:
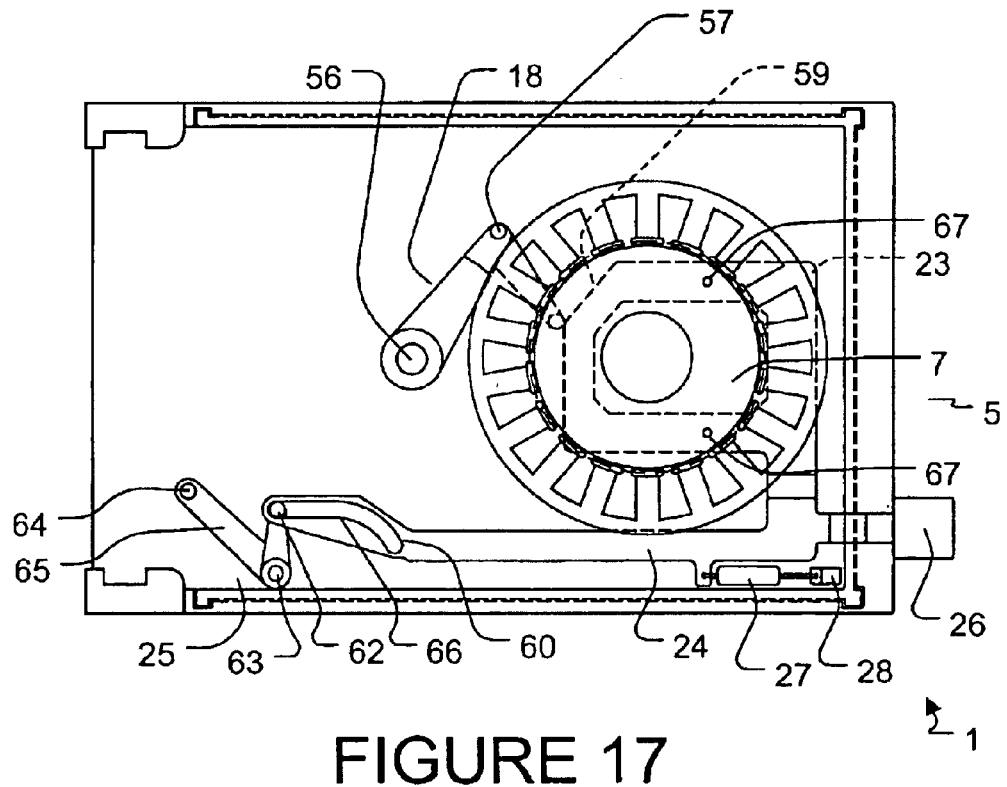
FIG. 17 illustrates the linkage mechanism with the card inserted into the reader.

FIG. 16 illustrates the linkage assembly 18 and linkage assembly 25 when card 45 is not installed in reader 1. FIG. 17 shows the state of these links when the card is fully installed. (For clarity, card 45 is not shown in these figures.) Linkage assembly 18 includes a pivot 56 and two roller posts 57 and 58. Post 58 interfaces with surface 59 on platform 23. A torsion spring, not shown, biases link 18 and pin 58 against the surface 59.

When the platform 23 is in the rear-most position, as shown in FIG. 16, pin 57 will have urged the rotor assembly 12 into the retracted position (illustrated in FIG. 3). When platform 23 is in the forward position, surface 59 will cause link 18 to rotate forward and move pin 57 away from rotor assembly 12 to a position where it acts as the inner crash stop.

Linkage assembly 25 includes roller pins 62 and 64. Pin 62 interfaces with contour 60 in link 24. Link 25 has a pivot 63 and a torsion spring, not shown, that biases the link forward and in the configuration shown in FIG. 16. Link 24 is attached to platform 23 and the button 26. A spring 27 is stretched between a tab on link 24 and a post 28 attached to the top cover 2. This spring is in the loaded condition as shown in FIG. 16.

Contour 60 holds pin 62 such that link 24 is locked in this condition. Upon insertion of card 45, the front edge of the card meets with roller 64 in link 65. This link then rotates rear-wards, carrying pin 62 in the cam profile 60. At a point 66 shown in FIG. 17, the cam profile 60 becomes parallel to the axis of spring 27, at which point spring 27 releases its tension, moving link 24 to the forward-most position. This also causes linkage assembly 18 to rotate about point 56, releasing the rotor assembly as described above. This set of events moves platform 23 towards the front panel, and the pressure exerted by the Poron in bottom cover 3 causes the card to conform to platform 23 and attain a flat configuration.

Figure 19:
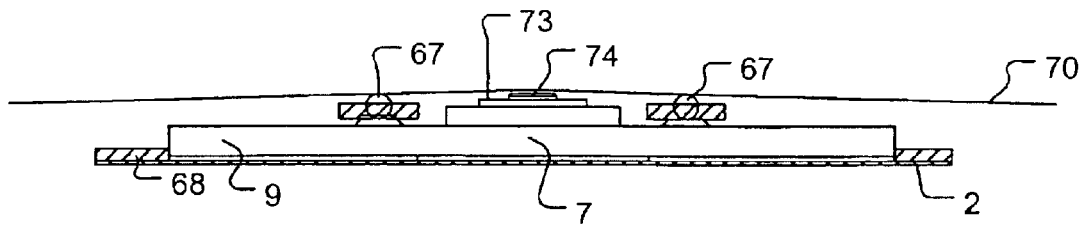
FIG. 19 illustrates the datum for removal of the card from the reader.

The spindle chuck plate 73 engages hub 42, while the spindle rotor shaft 74 centers disk 33 utilizing the hole in hub 42. This is illustrated in FIGS. 18 and 19. FIG. 18 shows the platform in the forward position, as also shown in FIG. 17. Platform 23 is supported by posts 69 that are formed in the spindle motor 7 referencing the surface of this platform to the spindle motor chucking plate 73. Plane 70 establishes the datum plane where the bottom surface of card 45 is supported in reader 1. FIG. 18 also shows a plate 68, about 0.025 inch thick, attached to the top cover 2 to reinforce it for improved rigidity of the rotor 12 and spindle 7 for high track density recording.

FIG. 19 shows the platform 23 in the rear most position. Platform 23 has features 67, which are steel balls suspended in a retainer formed in 23. These balls interface with the posts 69 pushing card 45 in a way such that disk 33 and the hub 42 are moved out of engagement with the spindle motor chucking plate 73 and the rotor shaft 74. This creates clearance for the card to be removed from the reader. The ejection of card 45 is accomplished when button 26 is depressed. When pushed in until the roller 62 moves to 66 in the cam profile 60, the torsion spring in link 25 rotates link 65 urging roller 64 towards the front panel 5. This action ejects the card 45 from reader 1. The spring forces are adjusted to allow these actions to occur smoothly, and in a manner where card 45 is not urged out of reader 1 with a large acceleration.

Figure 20:
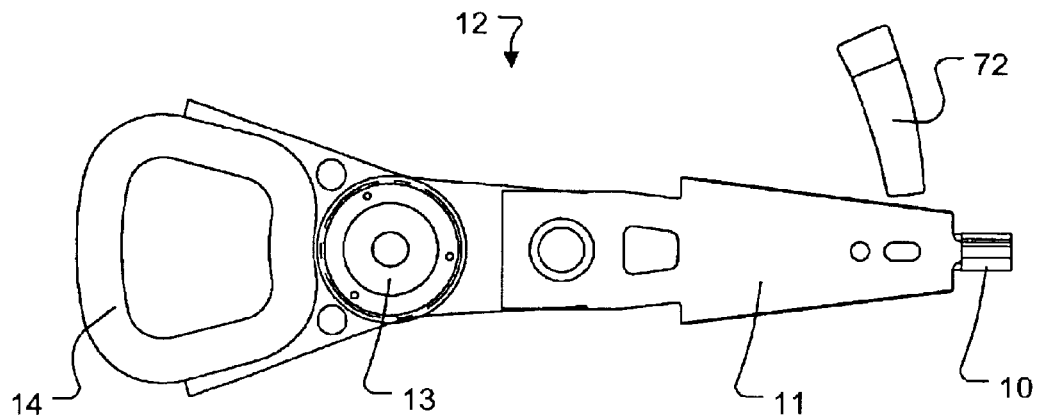
FIG. 20 is a plan view of the rotor assembly and the cam structure.
Figure 21:
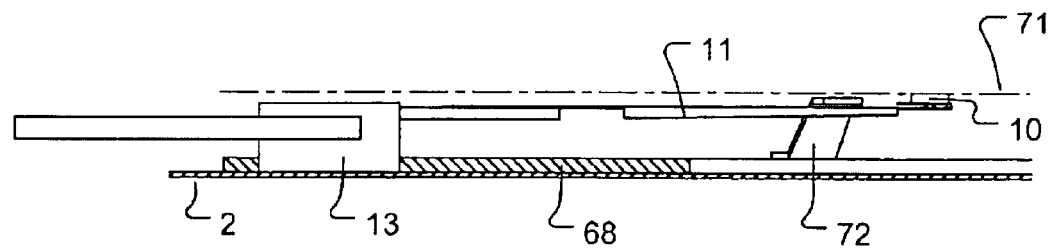
FIG. 21 is a side view of the rotor assembly and the disk plane.

FIG. 20 illustrates the structure of the rotor assembly 12. Read/write head 10 is mounted on gimbal 11. Gimbal 11 urges head 10 towards the disk with a force of about 4.5 grams. Further, tab 72 is mounted to the bottom of top cover 2, such that when rotor 12 is in the retracted position, as shown in FIG. 3, tab 72 holds the gimbal in a configuration that maintains a separation of about 0.01 inch between the air bearing surface of head 10 and the surfaces of card 45. FIG. 21 is a side view of the rotor 12 in the operating position. Line 71 represents the top surface of card 45. Layer 68 is about 0.025 inch and attached to the underneath side of top cover 2 to provide rigidity to the rotor pivot 13 and the spindle rotor 8. This rigidity enables high track density recording.

Figure 22:
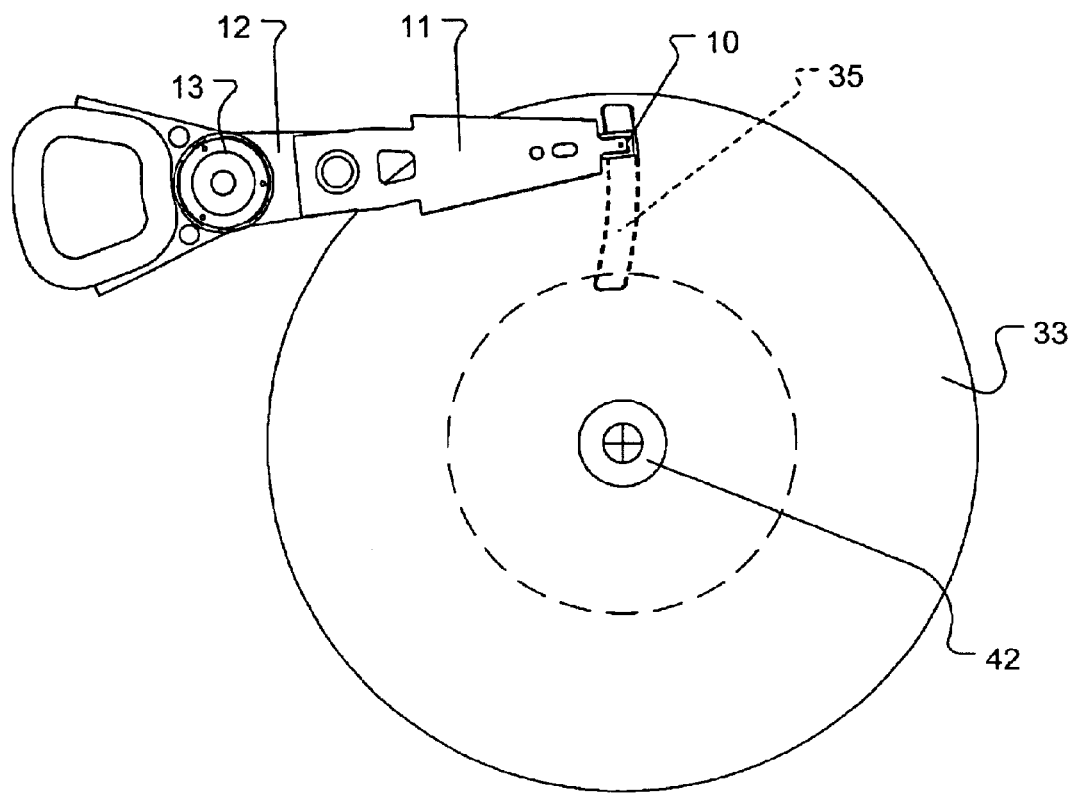
FIG. 22 illustrates the operating configuration of the disk and rotor assembly.

FIG. 22 depicts the structure of the rotor assembly 12 and its relationship to disk 33 when the card 45 is seated and centered on the spindle motor 7. The dashed line in the figure represents a data track. Disk 33, a Mylar floppy disk similar to the recording medium used in ZIP™ products, or optical tape media, rotates at high speeds, e.g. typically greater than 1200 RPM, in cavity 34 created in card 45.

Alternatively, the disk may be a flexible metal disk, such as taught by U.S. Pat. Nos. 5,968,627 and 6,113,753. In one such embodiment, disk 33 is a nickel steel substrate about 0.0008 inches thick. Both surfaces of the disk are sputter coated with a magnetic film typical of those used in the hard disk drive industry. Preferably, the disk magnetic properties include coercivity of about 3000 Oersted and an MrT of about 0.7 memu/cm$^2$. The recording head preferably is a GMR recording element, with an air bearing surface typical of that described in U.S. Pat. Nos. 4,974,106 and 6,023,393. In one embodiment the areal recording density is about 5 Gbits/in$^2$, thereby providing data storage capacity of 500 MBytes per surface, on disk 33. Current hard disk products in volume production utilize GMR recording heads. With suitable magnetic coatings, this can yield 20+Gbits/in$^2$ areal density, or a storage capacity per disk surface of about 2 GBytes.

Figure 23:
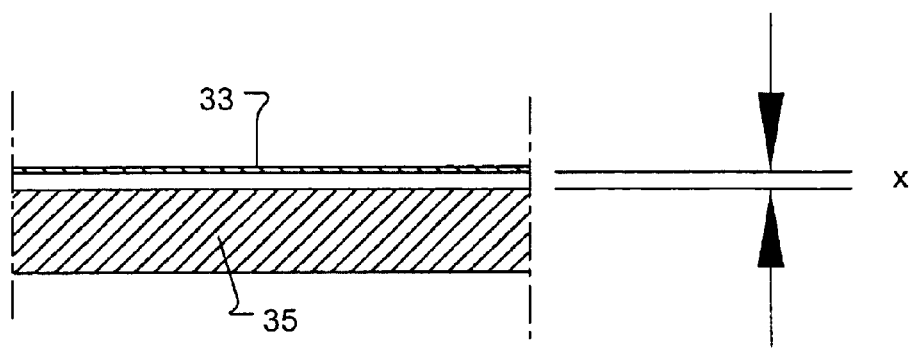
FIG. 23 illustrates details of the disk and the static head.

FIG. 23 illustrates the clearances between disk 33 and the static head element 35 in the case of a flexible metal disk implementation. In one embodiment, the clearance (parameter "x") is about 0.003 inch. The stainless steel disk 33 has some flexural rigidity and maintains this clearance when the head/gimbal assembly is positioned on the cam 72 or when card 45 is outside reader 1.

Figure 24:
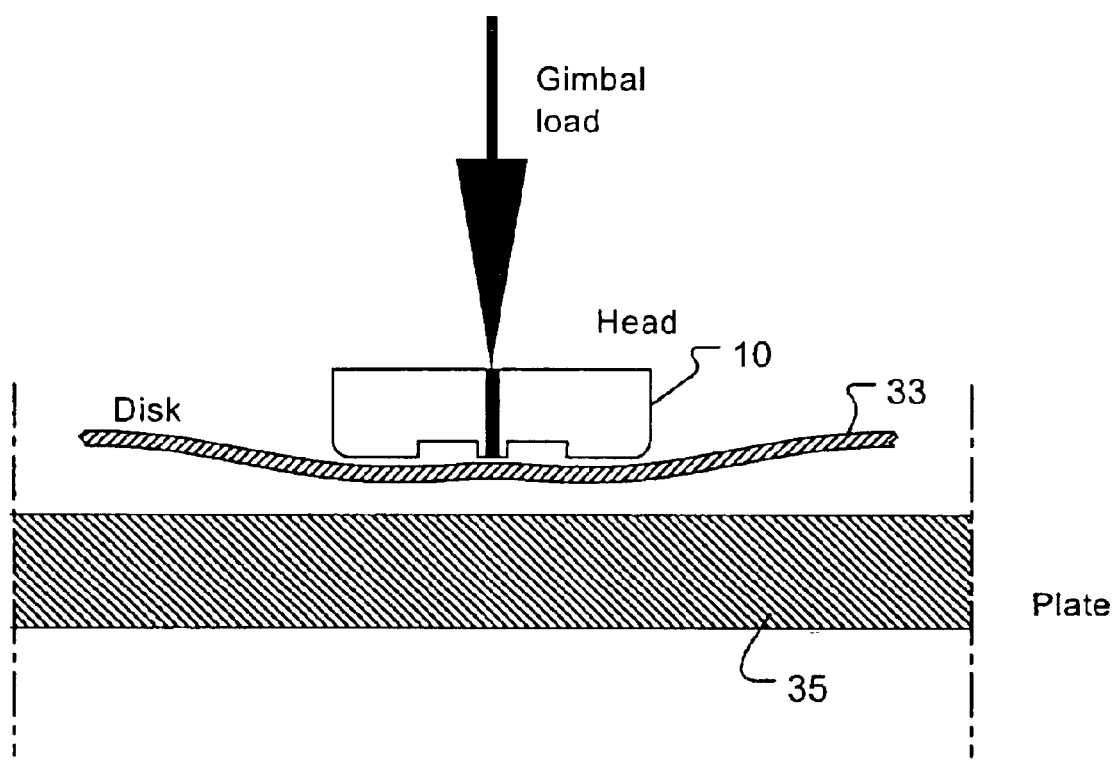
FIG. 24 illustrates an operating condition of the recording head and the disk.

FIG. 24 illustrates the disk with the rotor is moved into an operating position. In this condition disk 33 is rotating at about 3600 RPM, head 10 is urged toward the disk 33 with a force, "F", of about 4.5 grams by the gimbal 11. Air bearing forces develop between the surface of head 10 and the disk 33 surface adjacent to it, and between element 35 and the surface of disk 33 adjacent to it. The film adjacent to element 35 is large and acts as a hydro-dynamic pressure pad supporting the smaller air film separating the surfaces of head 10 and disk 33. The depression shown in the FIG. 24 is symmetrical for illustration purposes. The actual profile will vary depending upon the radial position of head 10.

During non-operating conditions clearance "x" prevents the disk surfaces from continually rubbing against the surface of element 35, which could generate wear particles and media defects.

Figure 25:
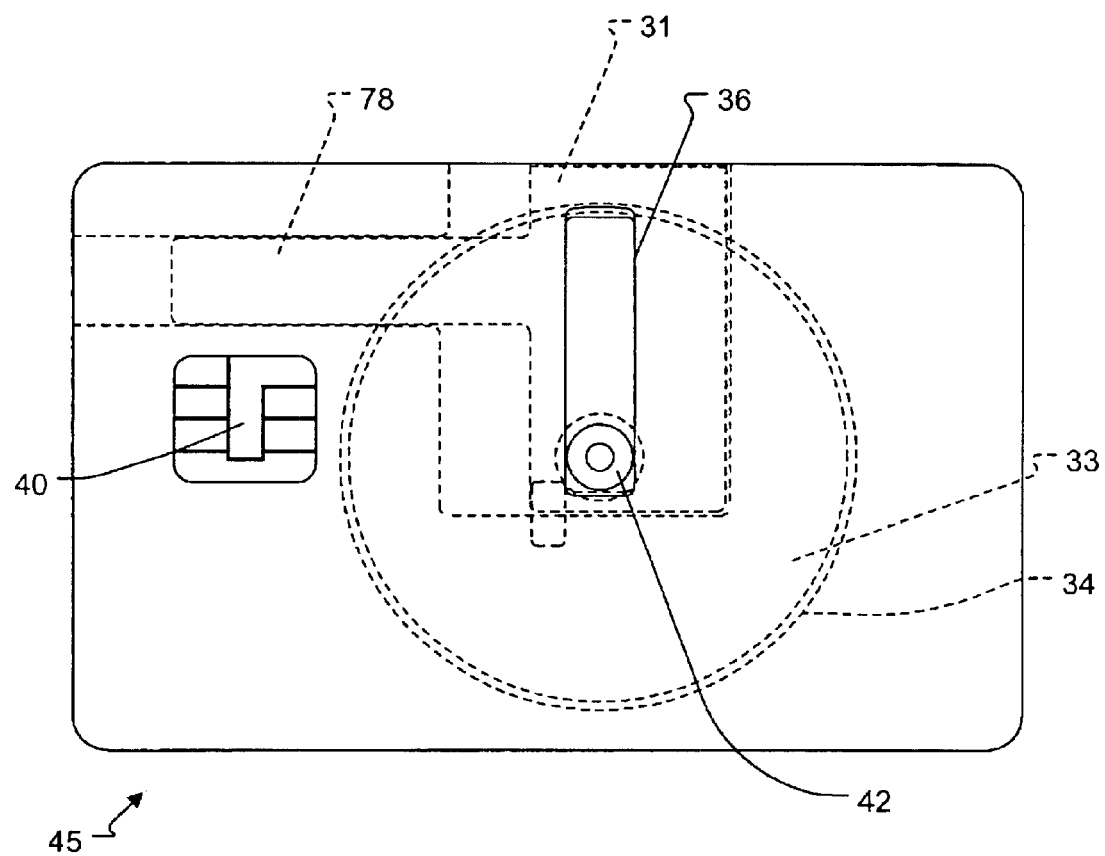
FIG. 25 shows a card with access ports on both faces of the card.
Figure 26:
FIG. 26 is a side view of the shutter.

FIG. 25 illustrates card 45 with access ports 36 on each of the top and the bottom surface of the card. The slot 36 in the top cover opposes a similar slot in the bottom cover of card 45. The shutter configuration is shown in side view in FIG. 26 with a spacer 76 and a top plate 75 opening and closing the access port on the top cover of card 45, and 77 which performs the same functions on the opposing face of card 45.

Figure 27:
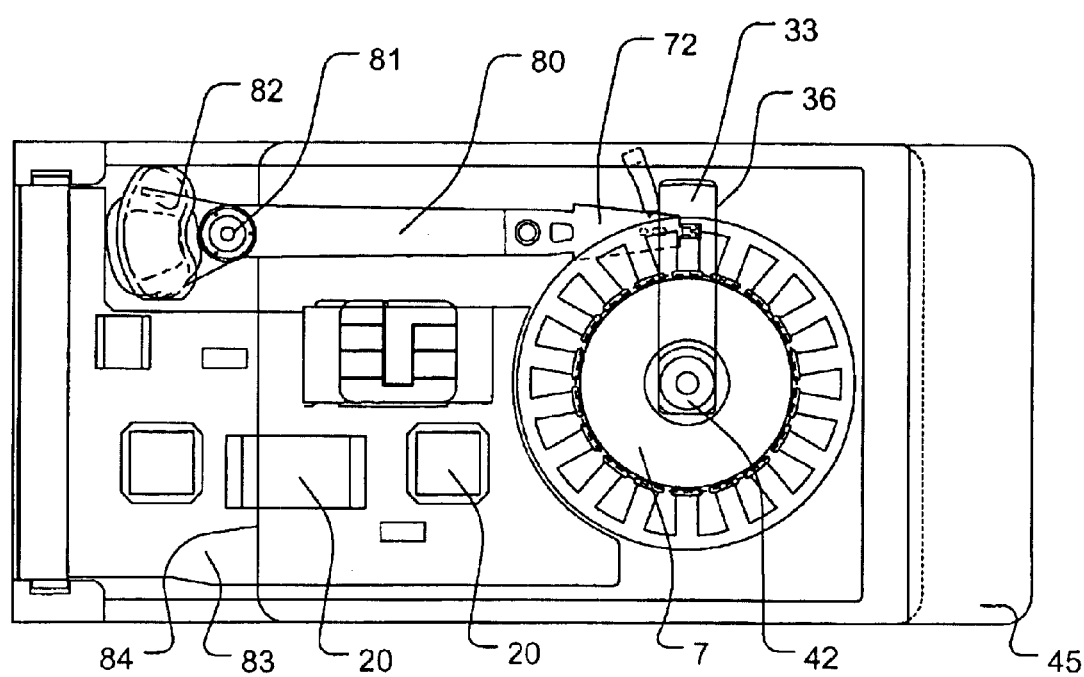
FIG. 27 illustrates a reader configured for PC card width, and heads for two sided recording.

FIG. 27 is a plan view of a reader which has a rotor pivot 81 and voice coil motor 82 configured such that card 45 is positioned between the top 80 and bottom 85 arms of the rotor. Pivot 81 is positioned such that voice coil motor 82 and the rotor assembly fit in a width of about 2.126 inches, which is the width of an ISO 7816 card and a PC card. The rotor arms 80 and 85 position the recording elements in the center of slot 36. Spindle 7 interfaces with hub 42 in card 45. In such an embodiment, the reader will be about 0.59 inches longer than the PC card. The PCB 83 and integrated circuits are mounted on the side of the voice coil motor/rotor assembly.

Figure 28:
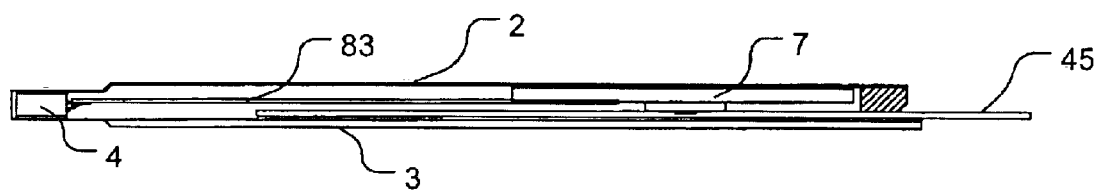
FIG. 28 is a side view of the reader with the card installed.

FIG. 28 is a side view of the reader. The linkage mechanisms and sealing element discussed earlier are omitted for clarity, but would be present as discussed above. In this embodiment, the reader is about 0.197 inches thick, and can be inserted in a PC Type II slot.

Figure 29:
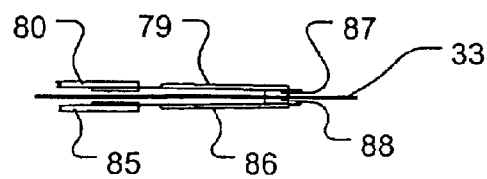
FIG. 29 illustrates the opposed head arrangement to record on both sides of the disk.

FIG. 29 illustrates an opposed head arrangement. Recording heads 87 and 88 are mounted such that disk 33 is sandwiched between these heads. Gimbals 79 and 86 apply a load of about 4.5 grams resulting in an equilibrium in the plane perpendicular to the disk surface. In other configurations gimbal 79 could be made stiffer than gimbal 86 to overcome disk flutter.

Figure 30:
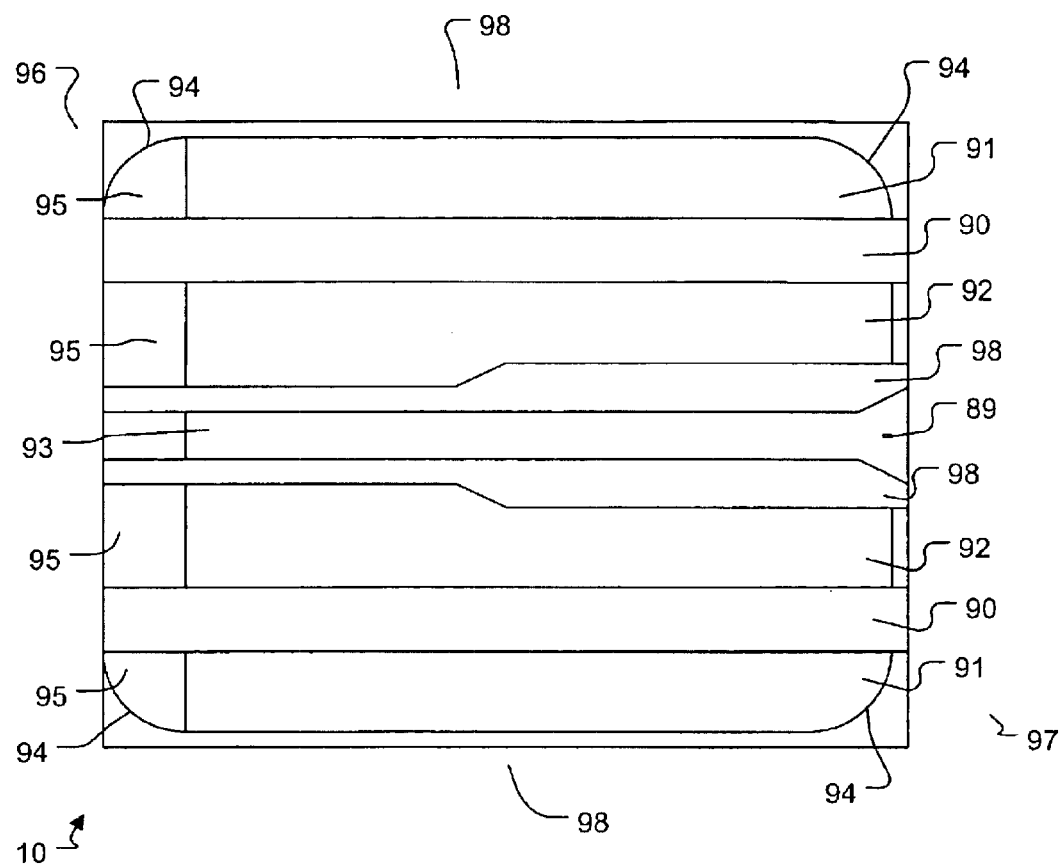
FIG. 30 shows the air bearing geometry of a gimbal mounted head.

FIG. 30 illustrates a specific embodiment for head 10. In this embodiment head 10 is about 0.049 inch long and 0.039 inch wide; such heads are known as "Pico" sliders. The figure illustrates the geometry of the side of the head that faces the disk 33. This side of the head is often termed the air bearing surface. This air bearing surface has a leading edge 96 and a trailing edge 97. Disk rotation will result in apparent motion from the leading edge towards the trailing edge.

Rails 91, 92 and 93 on the air bearing surface preferably are lapped to a flatness of better than 3 micro-inches. These rails develop positive air pressures when disk 33 is rotating—usually at greater than 1200 RPM. The air bearing surface preferably also has slots 90 and 98 that are at least 100 micro-inches deep. These slots are deep enough to maintain atmospheric pressure in them at all times. The positive air pressures on rails 91, 92 and 93 causes air to flow from these rails into the slots 90 and 98, carrying air borne contaminants away from the low flying points.

In the preferred embodiment, a GMR transducer element is employed, with a writing gap fabricated on the trailing edge of head 10, 89. An overcoat of about 0.001 inch in thickness is deposited over this transducer structure to protect it from environmental conditions. The corners, 94, of the air bearing surface are rounded with a radius of about 0.005 inch. A leading edge taper 95 in one embodiment has an angle of a few degrees and length of about 0.005 inch is formed, and the sides 98 and the trailing edge 97 have blends of about 0.001 inch in length. Rail 91 is about 0.005 inch wide, and the slot adjacent to this rail is about 0.004 inch wide. Rail 92 starts with a width of about 0.0065 inch at the leading edge 96 and is shaped by a variable width slot, 98. This slot has a width of about 0.0015 at the leading edge, and at a location 0.0215 inch from the leading edge, the slot width changes increasing by 0.0015 inch over a length of 0.003 inch. At a distance of 0.046 inch from the leading edge, the width of slot 98 changes again becoming 0.0015 inch at the trailing edge 97. The recording transducer 89 is centered in the tapered portion of rail 93. This head is mounted to gimbal 11 as shown in FIG. 22. The gimbal exerts a force "F" of about 3.0 grams at a point that is 0.029 inch down stream from the leading edge and is centered along the width of the head. This head opposes a fixed head 35 that is about 0.049 inch in length and is a continuous surface from an inner location to an outer position.

In this embodiment, transducer 87 will fly at about 1.5 micro-inches above the recording film on disk 33. The opposing disk surface is operating at a flying height of about 7 micro-inches minimum. The flying height on head 35 increases to 12 micro-inches beyond the boundaries of head 10. This action is similar to the head pushing against the surface of an inflated balloon. The low flying points on head 10 are backed with larger flying points on head 35, providing some compliance in the head/disk interface. This compliance allows the disk to move away to avoid contact, such as those contacts that could be caused by contaminants or imperfections in the disk surface.

Head 10 is mounted to a rotor arm 12 that pivots about 13 moving the recording element 89 over the recording band on disk 33. This rotary motion results in the angle of the velocity vector changing as the transducer 89 is positioned from the outer radius to the inner radius. The location of transducer 89 on the central rail 93 makes it insensitive to head roll.

Figure 31:
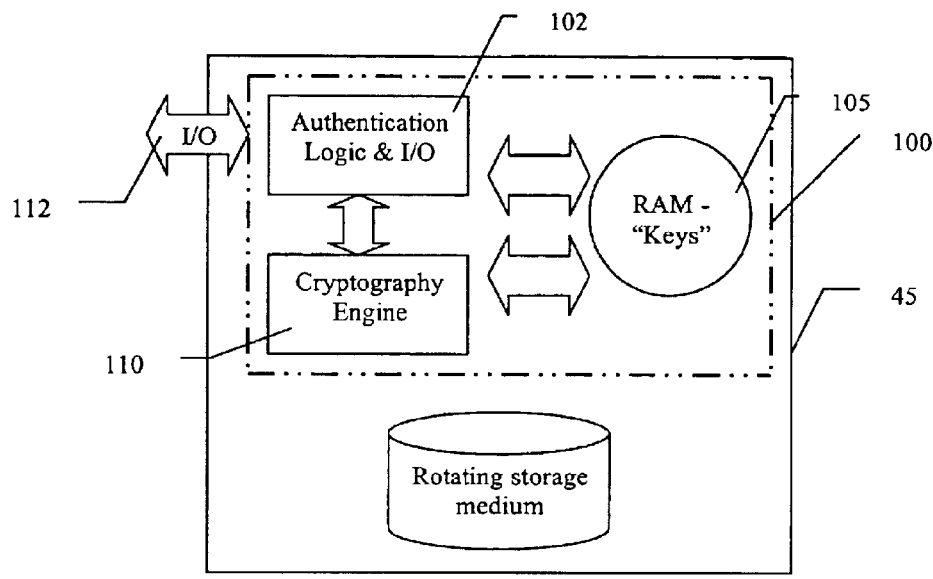
FIG. 31 is a block diagram of a card and integrated circuit affixed to the card.

As discussed in our copending U.S. patent application referenced above, in some embodiments of the card and reader, cryptography protection is employed. FIG. 31 illustrates one such embodiment. In this situation, integrated circuit 100 on card 45 preferably includes three functional blocks, authentication 102, RAM 105 and cryptography engine 110. The authentication logic 102 provides two functions, one for controlling the input and output 112 of data to and from integrated circuit 100, and a second for encrypting information, for example a public key encryption algorithm such as RSA, implemented in the integrated circuit 100 itself. The private key for the RSA is stored in RAM 105, along with a digital certificate. RAM 105 is active during authentication of a request to transfer data to or from the card 45. Once authentication is completed successfully, the input data stream is directed to the cryptography engine 110, where an AES algorithm is also implemented in hardware. The keys for this operation are also stored in RAM 105.

Figure 32:
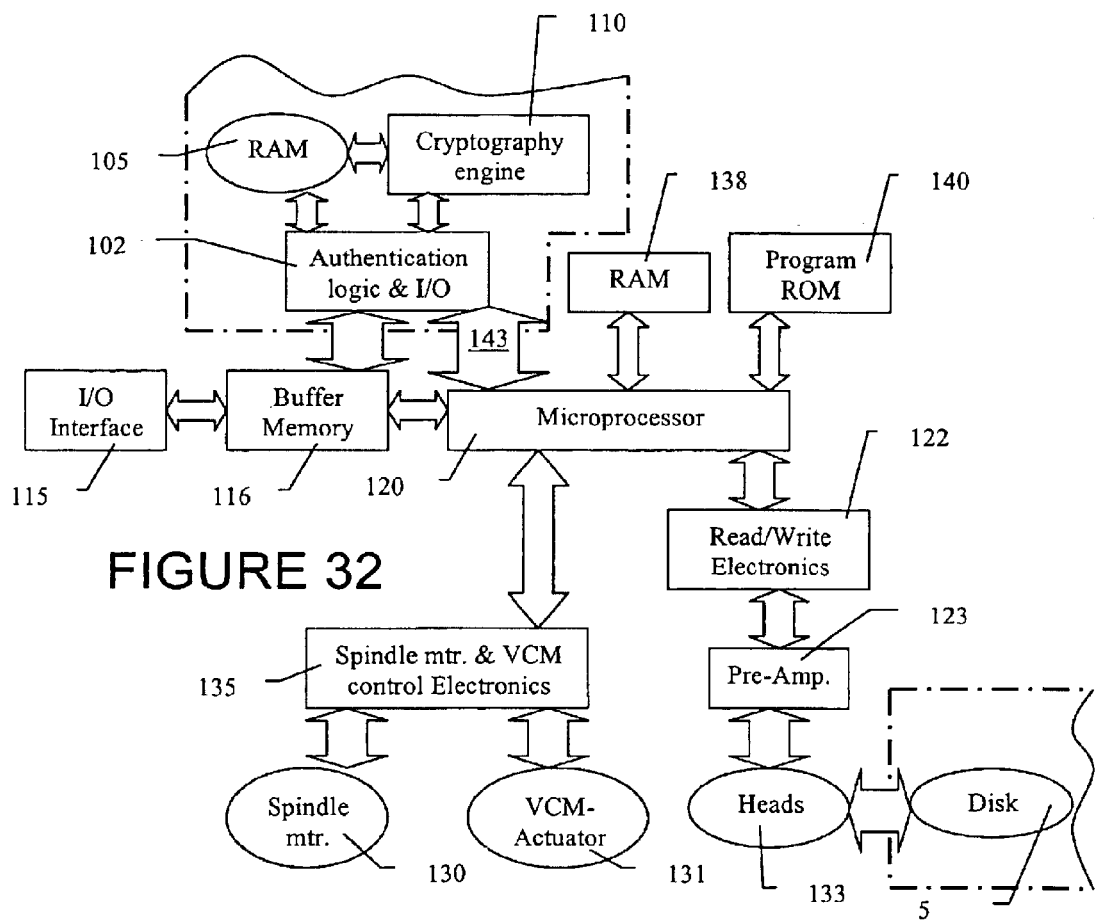
FIG. 32 is a block diagram illustrating the reader electronics and its interface with the card.

FIG. 32 illustrates the electronic block diagram for the reader, which includes all components outside the dashed lines (i.e. on the card). The reader electronics include an input/output block 115, which contains the protocol for an IDE and/or a PCMCIA interface. Other interfaces, for example, a USB interface or a custom interface configuration may also be employed. Data communicated between the host and the reader is stored in a buffer 116. In a well known manner not further described here, a microprocessor (or digital signal processor) 120 controls the flow of data to the recording heads 133 via the read/write electronics 122 and pre-amplifier drivers 123. The heads 133 read data from and write data to the disk 5. Other electro-mechanical components of the reader include the spindle motor 130 and the voice-coil head positioning actuator 131. These are controlled in a well known manner by microprocessor 120 through the electronics 135. Local RAM 138 is connected to microprocessor 120 to store real time parameters used in the operation of the storage card, such are current cylinder number, track run-out map and other variables. The program memory for microprocessor 120 is contained in ROM 140, preferably a flash memory to allow the control firmware contained in ROM 140 to be updated in the field.

Microprocessor 120 controls the flow of data to authentication block 102 of card 45 and the cryptography engine 110 through path 143. Preferably this communication is by serial interface because ISO 7816 identifies only eight contact points on card 45. The I/O logic in card 45 is selectable to communicate with microprocessor 120 or communicate with standard smart card readers. In this embodiment, the data flow supplied to card 45 occurs prior to the error detection and correction in the reader electronics. Successful decryption of data requires that the data stream be identical to the output data created during encryption, and data read errors must be corrected prior to this operation. Other embodiments allow the data to be directed to the card at other interfaces anywhere between the host interface and the recording head.

FIGS. 31 and 32 illustrate a card and reader mechanism where the cryptography logic is attached to card 45 and the rotating magnetic storage volume 5. In other embodiments encryption/decryption is implemented in software on the host system or the reader electronics. One advantage of the described configuration is that encryption algorithms and the storage are independent of the rest of the system. Consequently, new algorithms can be implemented without redesign of other parts of or all of the entire system. Additionally, the illustrated approach allows each card in a family of products to have different algorithms, thereby increasing the security of the data.

A typical application for the encryption discussed above is the secure download of a large data file, such as a movie, music or confidential information. This is described next. Assuming the confidential data file is located on a secure server, the operation of card 45 and reader electronics would entail the following sequence of events. The card reader mechanism is first installed in a system that has a communication channel to the secure server. Card 45 is issued to a user and a private key is stored in RAM 81, along with a digital certificate identifying the owner of the card. In other embodiments, the digital certificate consists of biometric templates encrypted and stored on disk 5.

Once the card 45 is inserted in the reader, a sequence of challenges are initiated between the reader and the card 45, utilizing logic 102, to establish the validity of the card and the reader electronics and second between card 45 and the host system to establish a secure communication channel. Once this is complete, the host system initiates communication with the secure server. The secure server initiates another set of challenges to the card 45. The card responds by sending encrypted messages using the RSA algorithm and the on-board private key. The secure server decrypts the message utilizing the public key assigned to the user of the specific card. A verification of the digital certificate is also performed. Alternatively, in other embodiments, the biometrics of the user are compared to stored templates. After the authentication process is complete, the secure server encrypts a set of session keys (symmetric keys) and information regarding the sequence with which the session keys will be utilized, to encrypt the confidential data. The file is sent to the card 45 utilizing the public key. Note that card 45 is the only card that can decrypt this message.

The session keys are stored in RAM 105 and the input/output logic 115 is configured to pass data to the cryptography engine 110 which performs no operation on the data stream and passes it on to the next logic block. The server then streams the encrypted data to the host system. This data passes through the buffer memory 116, the read/write electronics 122, the preamplifier 123 and is stored on the disk 5. When the transmission is complete, the server terminates the communication link.

At this point, the data stored on disk 5 is encrypted; the keys are in RAM 105, and both must operate together to reveal the stored information. In one embodiment this is achieved by a sequence where logic 102 initiates a challenge using a message encrypted with the private key and requests the host to acknowledge the request to display the data. This challenge and response sequence also establish the validity of the communication link to enable display of the data. Upon completion of this sequence the reader mechanism directs the data from disk 5 through the cryptography engine 110 where the cipher text is converted to data which is then passed on to the host system.

In an alternative method the data is transmitted encrypted from card 45 along with the encryption keys to the host in a manner similar to the secure server communication described earlier. This sequence requires that the host have a microprocessor. In this arrangement card 45 also contains the cryptography logic as software stored on disk 5. This logic is itself securely transmitted to the host and used to perform the decryption of the data. For hosts that do not have computational capability, preferably the decryption is performed by logic 110 on card 45 and delivered to the host.

Figure 33:
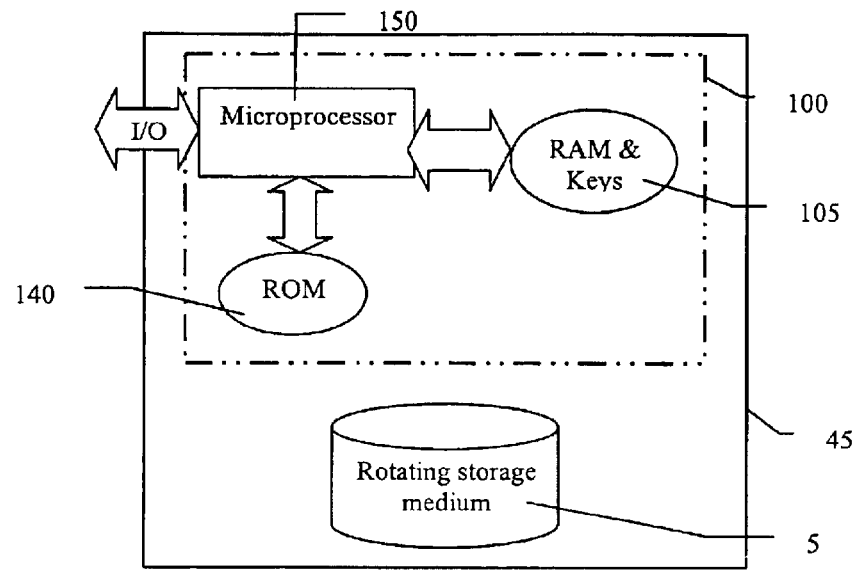
FIG. 33 is a block diagram of another embodiment of a card and integrated circuit affixed to the card.

FIG. 33 illustrates another embodiment of the card 45. In this arrangement a microprocessor 150 is included in the card, together with RAM 105, program ROM 140, and the rotating storage medium 5. In addition to a digital signal processor, the microprocessor 150 can also be implemented as a state machine operating under control of a microprocessor 120 in the reader (see FIG. 32). The cryptography engine in this implementation includes microprocessor 150 and the control program is stored in ROM 140. A feature of this arrangement is that RAM 105 can be utilized as a special buffer for disk 5. This enables the card 45 to be legacy compatible as all communication is between the microprocessor 150, RAM 105 and the external system through the contacts on the integrated circuit. Operation in this manner allows the card to be utilized with legacy Smart Card readers.

In another embodiment, card 45, as shown in FIG. 33, is configured as a server, where the control program for microprocessor 150 contained in ROM 140 allows it to fetch data and files from the storage volume 5. Additionally, the fetched program can also include security firmware to create a firewall with client authentication prior to any data access from disk 5. Of course in other embodiments, microprocessors 150 and 120 can be configured to provide other programmable features.

Figure 34:
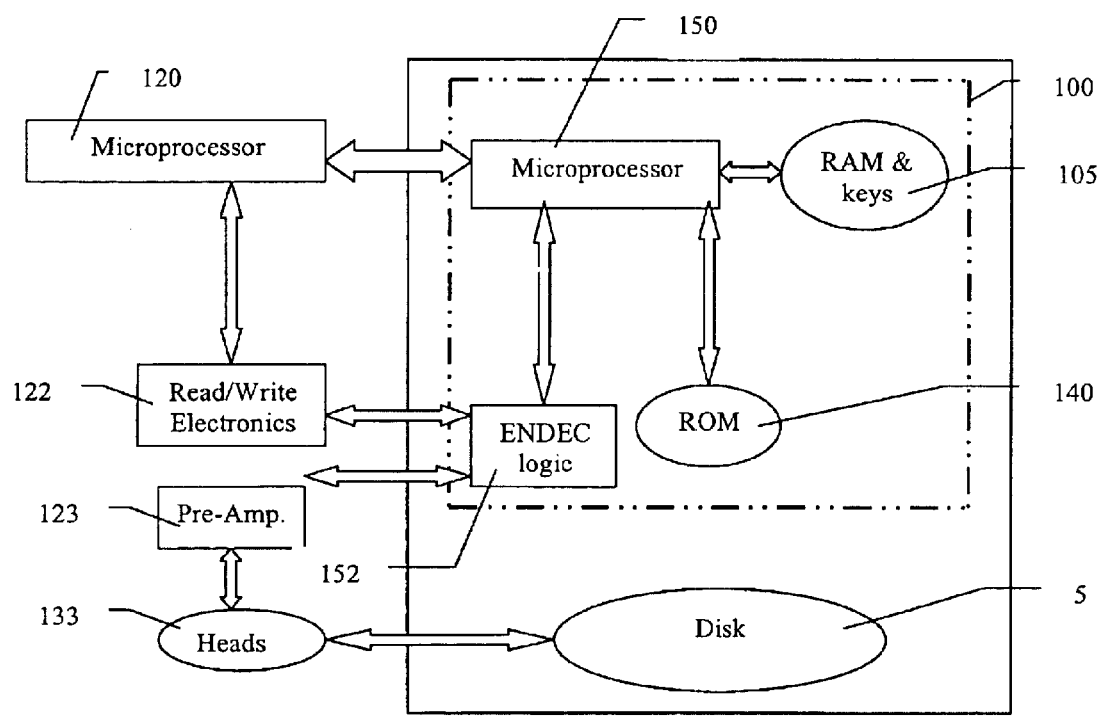
FIG. 34 is a block diagram of a further embodiment of a card and integrated circuit affixed to the card illustrating its connection to the reader.

In another embodiment illustrated in FIG. 34, card 45 is configured with a microprocessor 150, RAM 105, program ROM 140, disk 5, and an encoder/decoder (ENDEC) 152. The ENDEC 152 implements the encode/decode logic utilized in the read/write electronics of the reader. In this configuration the read/write circuitry block in the reader does not include the encode/decode functions, which is instead performed with logic on the card. The information flow is then from the card, to preamplifier 123, and then to the recording heads 133.

In other embodiments ENDEC 152 consists of a switch controlled by microprocessor 150 or as a state machine implemented on the card. One advantage of this approach is that access to disk 5 can be controlled and limited to a certain number of times, after which the switch in the card can be disabled. This allows for "limited" use of the card data, beyond which it is not accessible. In still further embodiments, the ENDEC 152 logic allows the removable card to carry encode/decode information for a PRML coding scheme where the parameters can be specific for one card and different from those used in another card.

Figure 35:
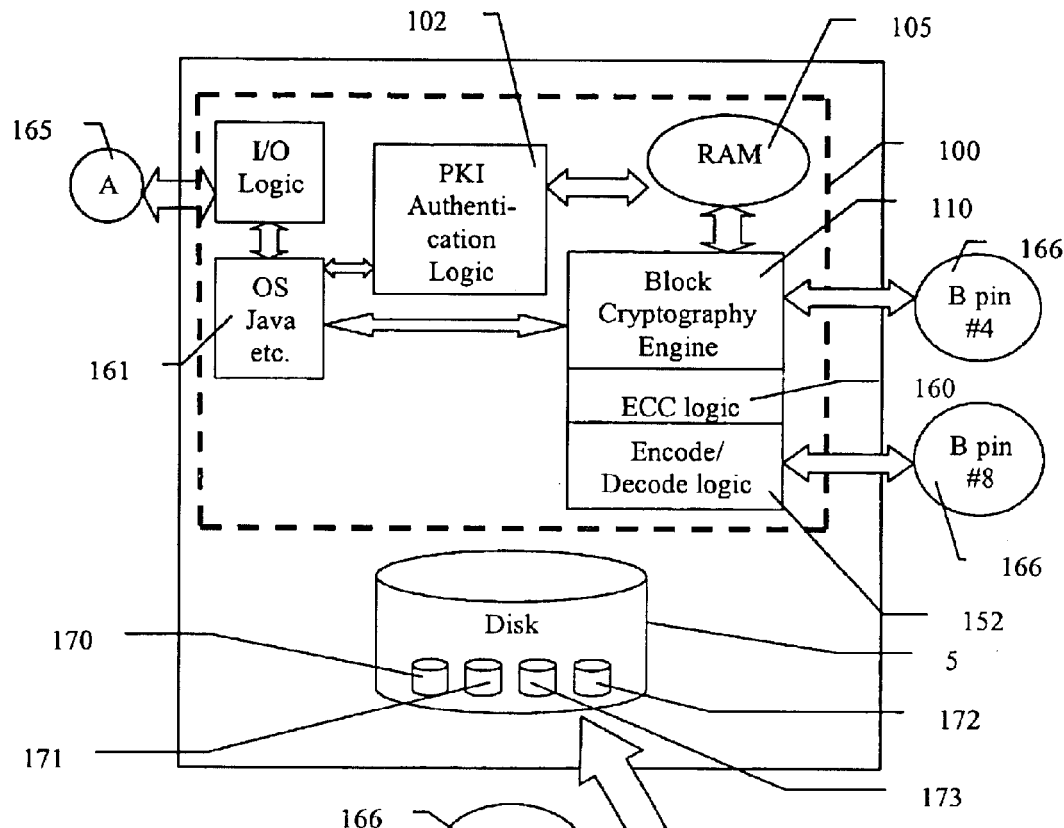
FIG. 35 is a block diagram of a further embodiment of the reader electronics and its interface with the card.
Figure 35:
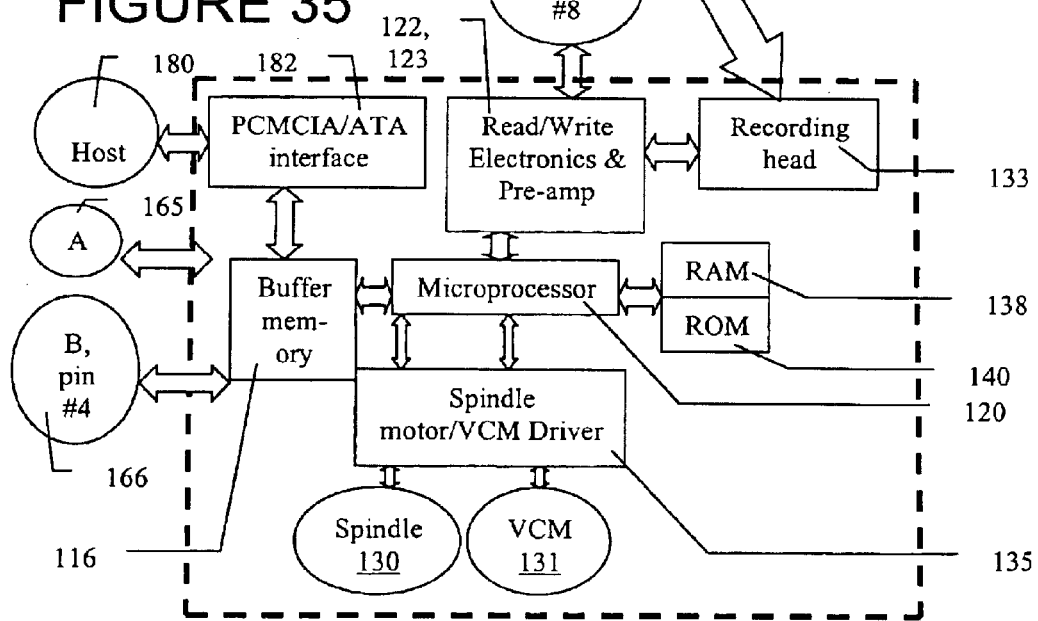

In another embodiment illustrated in FIG. 35, the integrated circuit 100 includes the functional blocks of authentication logic 102 using public key cryptography, block encryption logic 110 implementing in hardware algorithms such as DES, Triple DES or AES, error detection and correction logic 160, data encode and decode logic 152, a local operating system 161 such as JAVA, MULTOS or others, and input/output logic 112. In this implementation, integrated circuit 100 communicates via an eight pin interface 165 labeled "A" per ISO standard 7816-2 and -3. This interface, as presently defined, has two unused pins #4 and #8, these are labeled "B" and form a serial bi-directional interface 166. The storage volume 5 in one embodiment is partitioned into multiple sub-volumes 170, 171, 172 and 173. Other embodiments include a single partition or many more such partitions with each partition having a unique security code. Access to data in a specific sub-volume can be conditional upon receiving the required information from the host or client requesting the data. In this situation, buffer memory 116 and microprocessor 120 communicate with integrated circuit 100 via contact pin numbers 1, 2, 3, 4, 5 and 6. Pin #8 is connected to the read/write electronics 122, 123, to form the bi-directional serial interface "B" 166. The data from read/write electronics 122 is directed to the recording head 133 and magnetic flux transitions are recorded on disk 5 via a non-contact interface between the recording head 133 and the rotating disk 5. In this situation the data path from the host 180 passes through the PCMCIA/ATA interface 182 and the buffer memory 116 to the serial interface "B" pin #4. This data is directed through the block cryptography hardware 110 located in integrated circuit 100 on the card. This block can be set to be activated to encrypt this information or to merely pass this information on to the error detection and correction logic 160 depending upon the set-up conditions established by microprocessor 120 or the local operating system 161. The data is then processed to develop syndromes for suitable error detection and recovery and then coded. In one embodiment, the coding utilizes PRML coding in encode/decode 152 prior to being passed on the read/write electronics 122. The file operating system preferably resides on disk 5 and can be controlled by the local operating system 161 or downloaded to the host 180 upon authentication by logic 102.

On the return path, magnetic flux transitions recorded on the disk 5 surface create electrical signals in the recording head 133 that are then amplified by the read/write electronics 122. Then they are passed to the encode/decode logic 152. The data is processed by logic 160, to detect and correct any read errors, all prior to being decrypted by the cryptography engine 110. This data can then be delivered to the host 180 through the buffer memory 116 and the interface controller 182. Of course, the integrated circuit 100 can be configured in other ways to provide other functionality depending upon the users preferences.

The preceding has been a detailed description of the preferred embodiments of the invention. It should be appreciated that many details of the preferred embodiment have been described, including numerous dimensions of the components. The following claims will define the scope of the invention.

What is claimed is:

1. In a system in which data is stored on a rotating magnetic memory in a credit card sized apparatus, reading apparatus for reading the data comprising:
   a port for receiving the credit card sized apparatus;
   a motor for being coupled to the rotating magnetic memory to cause it to be rotated; and
   a magnetic head for engaging the rotating magnetic memory for reading information from the rotating magnetic memory;
   a series of electrical connections for enabling the reading apparatus to be coupled to a host system; and
   wherein as the credit card sized apparatus is inserted into the port, the credit card sized apparatus is caused to deform, and the deformation allows the credit card sized apparatus to engage the motor.

2. A system as in claim 1 wherein the credit card sized apparatus includes a shutter to protect the rotating magnetic memory, and the reading apparatus further comprises an actuator for opening the shutter when the credit card sized apparatus is inserted into the port.

3. A system as in claim 1 wherein the reading apparatus couples to the host system through a PCMCIA adapter.

4. A system as in claim 3 wherein the reading apparatus couples to the host system through a Type II PC card adapter.

5. A system as in claim 3 wherein the reading apparatus couples to the host system through a slot for a PCMCIA card, and the host system controls the reading apparatus by providing signals to the series of electrical connections.

6. A system as in claim 1 further comprising at least one integrated circuit disposed within the reading apparatus for controlling at least one of the motor and the magnetic head.

7. A system as in claim 1 wherein the credit card sized apparatus conforms to the ISO 7816 standard and the reading apparatus is in a format corresponding to a Type II PC card.

8. A system as in claim 6 wherein the integrated circuit is selectively connectable to a host system to receive information.

9. A system as in claim 8 further comprising a low profile connector positioned within the reading apparatus to connect to the integrated circuit.

10. A system as in claim 1 further comprising a magnet disposed within the reading apparatus for engaging material in the credit card sized apparatus to open a shutter to thereby allow the magnetic head to be positioned in close proximity to the rotating magnetic memory.

11. A system as in claim 1 wherein as the credit card sized apparatus is initially inserted into the reading apparatus, the magnet in the reading apparatus attracts a second magnet in the credit card sized apparatus, and in doing so the second magnet is lifted from a slot.

12. A system as in claim 1 wherein:
   the rotating magnetic memory includes a hub having an opening;
   the motor includes a shaft and a spindle chuck plate which protrude above a surface upon which the credit card sized apparatus rests when inserted into the port; and
   as the credit card sized apparatus is inserted into the port it flexes, to enable the shaft to engage the opening in the hub and the spindle chuck plate to engage the hub.

13. A system as in claim 1 further comprising an encryption system which does not allow the reader to retrieve information from the card without a key.

14. A system as in claim 13 wherein the encryption system allows only a limited number of accesses to the card.

15. A system as in claim 14 wherein the reading apparatus further comprises:
    read/write circuitry for reading data from the magnetic head;
    a microprocessor for providing an interface with the card and with the read/write circuitry; and
    motor control electronics for controlling the motor and the position of the magnetic head.

16. A system as in claim 15 wherein the reading apparatus further comprises a second magnetic head for reading information from the rotating magnetic memory.

17. A system as in claim 1 wherein the reading apparatus further comprises a layer of resilient material, which, when the credit card sized apparatus is inserted into the reader helps flatten the credit card sized apparatus.

18. A system as in claim 1 further comprising a mechanism for ejecting the credit card sized apparatus from the reading apparatus in response to activation of the mechanism by the user.

19. In a system in which data is stored on a rotating magnetic memory in a flexible card no larger than a credit card, a reader for reading the data comprising:
    a port for receiving the card;
    a motor for being coupled to the rotating magnetic memory to cause it to be rotated;
    a magnetic head for engaging the rotating magnetic memory for reading information from the rotating magnetic memory;
    wherein as the card is inserted into the port, the card is caused to deform, and the deformation allows the card to engage the motor.

20. A reader as in claim 19 further including an activation device to deform the card away from the motor when removal of the card from the reader is desired.

21. A reader as in claim 20 wherein the card is caused to deform by a mechanism comprising a reference surface upon which the card is positioned when inserted into the port, and an object which is movable between a first position beneath the reference surface in which the card is not deformed and a second position above the reference surface in which the card is deformed.

22. A reader as in claim 21 wherein the object comprises a bearing positioned on a lower surface beneath the reference surface, the lower surface having contours at a first location in which the bearing is recessed below the reference surface and a second location in which the bearing protrudes above the reference surface.

23. A reader as in claim 20 wherein the mechanism includes a linkage which is activated by the flexible card as it is inserted to deform the card away from the motor.

24. A reader as in claim 23 wherein the linkage is coupled to the activation device.

25. A reader as in claim 22 wherein the object comprises a pair of bearings restrained within openings in a plate and which bearings rest on the lower surface.

26. A reader as in claim 25 wherein insertion of the card causes the mechanism to move the plate, and thereby move the bearings along the lower surface.

27. A reader as in claim 25 wherein when the activation device is engaged, the mechanism moves the plate and thereby moves the bearings along the lower surface.

28. In a system in which data is stored on a rotating magnetic memory in a card no larger than a credit card, the card having a shutter to protect the magnetic memory, a reader for reading the data, the reader comprising:
    a port for receiving the card;
    an actuator for opening the shutter when the card is inserted into the port,
    apparatus for deforming the card as it is inserted into the port;
    a motor for being coupled to the rotating magnetic memory to cause it to be rotated;
    a magnetic head for engaging the rotating magnetic memory for reading information from the rotating magnetic memory; and
    a magnet for engaging an object in the card to open the shutter to thereby allow the magnetic head to be positioned in close proximity to the rotating magnetic memory.

29. A system as in claim 28 wherein as the card is initially inserted into the reader, the magnet in the reader attracts the object from a first position to a second position enabling opening of the shutter.

30. In a system in which data is stored on a rotating magnetic memory in a card apparatus no larger than a credit card, the rotating magnetic memory including a hub having an opening, a reader for reading the data comprising:
    a port for receiving the card;
    a motor for being coupled to the rotating magnetic memory to cause it to be rotated, the motor including a shaft and a spindle chuck plate which protrude above a surface upon which the card rests when inserted into the port;
    a magnetic head for engaging the rotating magnetic memory for reading information from the rotating magnetic memory; and
    wherein as the card is inserted into the port it is caused to flex, thereby enabling the shaft to engage the opening in the hub and the spindle chuck plate to engage the hub.

31. In a system in which data is stored on a rotating magnetic memory in a card no larger than a credit card, a reader for reading the data comprising:
    a port for receiving the card;
    a motor for being coupled to the rotating magnetic memory to cause it to be rotated;
    a magnetic head for engaging the rotating magnetic memory for reading information from the rotating magnetic memory;
    a series of electrical connections for enabling the reading apparatus to be coupled to a host system; and
    an encryption system which does not allow the reader to retrieve information from the card without a key, and wherein the encryption system allows only a limited number of accesses to the card.

32. A reader for reading data stored on a rotating magnetic memory in a flexible card no larger than a credit card and having a hub about which it can be rotated, the reader comprising:
    a port for receiving the flexible card;
    a motor for being coupled to the rotating magnetic memory to cause it to be rotated about an axis;
    a magnetic head for engaging the rotating magnetic memory for reading information from the rotating magnetic memory;
    a series of electrical connections for enabling the reading apparatus to be coupled to a host system; and
    a mechanism for engaging the flexible card as it is inserted into the reader to cause the flexible card to deform in a direction along the axis and away from the motor, and for allowing the flexible card to return to an undeformed condition when the flexible card is positioned to have the hub over the axis to enable engagement of the hub and the motor.

33. A reader according to claim 32 wherein the mechanism further includes an activation device to deform the card away from the motor when removal of the card from the reader is desired.

34. A reader as in claim 33 wherein the mechanism includes a reference surface upon which the flexible card is positioned when inserted, and an object which is movable between a first position beneath the reference surface in which the flexible card is not deformed and a second position above the reference surface in which the flexible card is deformed.

35. A reader as in claim 34 wherein the object comprises a bearing positioned on a lower surface beneath the reference surface, the lower surface being movable between a first location in which the bearing is recessed below the reference surface and a second location in which the bearing is caused to protrude above the reference surface.

36. A reader as in claim 34 wherein the mechanism includes a linkage which is activated by the card as it is inserted to deform the card away from the motor.

37. A reader as in claim 36 wherein the linkage is coupled to an activation device.

38. A reader as in claim 35 wherein the object comprises a pair of bearings restrained within openings in a plate and which bearings rest on the lower surface.

39. A reader as in claim 35 wherein insertion of the card causes the mechanism to move the plate and thereby move the bearings along the lower surface.

40. A reader as in claim 39 wherein when the activation device is engaged, the mechanism moves the plate and thereby moves the bearings along the lower surface.

* * * * *